United States Patent Office 3,533,530
Patented Oct. 13, 1970

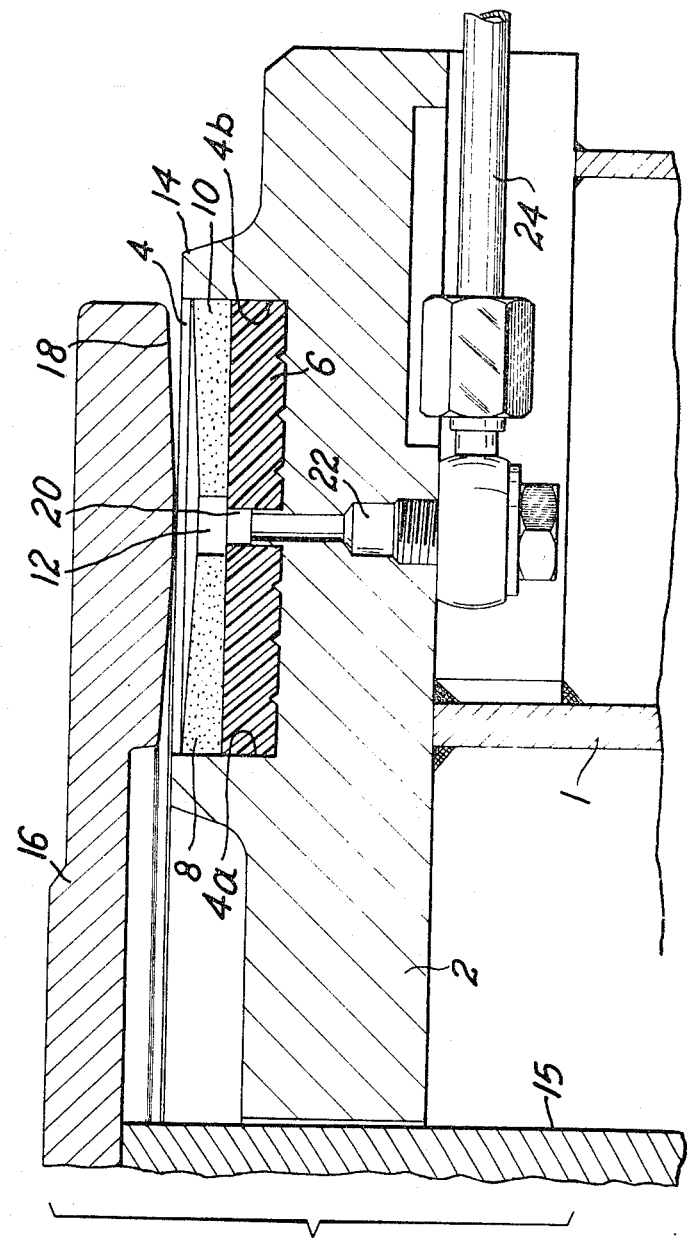

3,335,530
LEAK-TIGHT SUPPORT FOR ROTARY SEAL PLUG
Sabino Gallo, Jacques Marseille, Bernard Morin, and Michel Sauvage, Aix-en-Provence, France, assignors to Commissariat a l'Energie Atomique, Paris, France
Filed Jan. 8, 1969, Ser. No. 789,861
Claims priority, application France, Jan. 18, 1968, 3,533,530
Int. Cl. B65d 53/00
U.S. Cl. 220—46                                    8 Claims

ABSTRACT OF THE DISCLOSURE

The rotary seal plug of an enclosure which contains a dangerous atmosphere must be capable of rotating without causing any interruption of leak-tightness. To this end, the plug is rigidly fixed to a crown-plate which is slidably supported on a stationary track laid on a flexible member within an annular groove of the enclosure wall. The track comprises two concentric rings which are set at a small distance from each other and the top faces of which are inclined, the crown-plate being provided with an underface of corresponding shape. In addition, a gas at overpressure is fed into the space which is formed between the two rings.

---

This invention is concerned with a leak-tight support for a rotary plug which serves to seal an enclosure and especially an enclosure in which the internal atmosphere consists of a dangerous or corrosive fluid and which must therefore be tightly sealed and isolated from the exterior.

The invention is more especially concerned among supports of this type with those which are intended for seal plugs which must be capable of rotation about their own axes without impairing the leak-tightness of the enclosure.

This is especially the case with the plugs at present employed for closing tanks in nuclear reactors of the sodium-cooled type, these plugs being mounted to rotate about their own axes at low speeds for purposes of instrumentation and handling. In reactors of the type referred to, the rotary seal plug is usually supported on ball-bearings which facilitate rotational motion whilst tightness of the closure is provided by means of a separate seal such as a liquefiable seal or a lipped seal.

Unfortunately, it is a matter of some difficulty to provide a seal which is capable of retaining its effectiveness over a fairly long period of time inasmuch as liquefiable seals oxidize very readily whereas lipped seals are extremely delicate. Periodic inspection and facilities for replacement of the seal are consequently made necessary.

In order to remove this limitation and to overcome the disadvantages mentioned, the present invention provides a support which permits of easy rotational motion of the seal plug with a minimum effort while at the same time ensuring leak-tightness and avoiding any danger of corrosion or damage to the seal.

The support in accordance with this invention essentially comprises on the one hand a stationary track having a low coefficient of friction and laid on a flexible member which is secured to the wall of the enclosure and on the other hand a crown-plate applied against said track in sliding contact therewith and rigidly fixed to said seal plug.

According to another property of the invention, the track is provided in the central portion thereof with an opening which serves to establish a communication with a source of neutral gas which is at overpressure both with respect to the interior and with respect to the exterior of the enclosure.

The flexible member which is preferably formed of an elastomer such as rubber provides the closure unit with effective leak-tightness whilst friction between the track and the crown-plate which is rigidly fixed to the seal plug is reduced to a fairly low value without resorting to the use of a lubricant. The pressure of the neutral gas also prevents the escape of radioactive products derived from the reactor and prevents flexible member from being in contact with the corrosive air or fluid within the enclosure and consequently removes any danger of oxidation or chemical attack.

A number of other advantages and properties of the invention will in any case become apparent from the following description of one form of construction which is given by way of nonlimitative example and illustrated partially in the fragmentary sectional view of the single figure of the accompanying drawings.

In the accompanying drawing a vertical sectional view of a preferred embodiment of the present invention is shown.

In the drawing enclosure 1 to be sealed is provided at the top with an annular base-plate 2 in which is cut a groove 4, said groove being concentric with said base-plate and with the enclosure itself.

A flat annular member 6 formed of flexible material such as an elastomer is forcibly inserted in said groove 4 and supports two concentric rings formed of material which has a low coefficient of friction such as polytetrafluoroethylene. Said two rings 8 and 10 are in contact with the side walls 4a, 4b of the groove 4, an annular space 12 being formed between said rings. Each ring has a substantially trapezoidal cross-section so that the top faces thereof are inclined symmetrically with respect to the center-line of the groove 4 in the direction of the space 12.

Said groove 4 is preferably cut in an annular boss 14 which projects from the top face of the base-plate 2. The depth of said groove is slightly greater than the assembly consisting of the annular member 6 and the ring 8 or 10.

Above said base-plate 2, the rotary plug 15 is rigidly fixed to a crown-plate 16, a downwardly-directed peripheral projection 18 being formed on said crown-plate and having an underface which corresponds in shape to the surface of the track formed by the rings 8 and 10 and which is therefore slightly frusto-conical, the small base of the cone frustum being located directly above the space 12. Said projection 18 has a width which is very slightly smaller than that of the groove 4 in order to be capable of penetrating into the interior of said groove and of bearing on the track.

The space 12 is also connected to a source of neutral gas under pressure such as an argon source, for example (not shown) by means of at least one hole 20 which is pierced in the flexible annular member 6, by means of a duct 22 which is formed in the base-plate 2 and by means of a pipe 24. Said space 12 is thus supplied and maintained at a pressure which is higher than the pressure which is maintained within the enclosure 1 and also higher than the outer atmosphere.

When the seal plug is driven in rotation, the weight of the plug nevertheless continues to be carried by the track and by the annular member 6, with the result that the contact between the different components remains the same and that leak-tightness is not modified. The materials which constitute the track and the projection 18 are such that said projection slides over the rings 8 and 10 with an extremely low coefficient of friction and that this sliding motion can accordingly be initiated with the minimum effort. For example, in the case of a crown-plate 16 made of steel and rings 8 and 10 made of polytetrafluoroethylene, the coefficient of friction is lower than 0.15.

Moreover, while the movement of rotation of the seal takes place, the presence of the neutral gas under pressure prevents any fluid contained in the enclosure from escaping to the exterior and also prevents any external fluid from penetrating into the enclosure.

Without making use of any lubricant, there is thus obtained a support which is capable of carrying a substantial load and at the same time of ensuring leak-tightness during displacement of said load.

Oxidation and excessive wear of the annular member 6 which is formed of elastomer are not liable to occur inasmuch as said member is protected against any contact with the hazardous or toxic atmosphere of the enclosure both by the rings and by the neutral gas. Leak-tightness remains fully effective irrespective of the duration of utilization of the support and consequently of the seal.

By way of example, a rotary plug mounted on a support according to the invention has carried out 20,000 revolutions under test conditions as follows:

Medium: sodium vapor within the enclosure, atmospheric air outside the enclosure;
Mean contact pressure: 8 bars;
Rate of sliding of the crown-plate 16 over the track 8, 10: 5 cm./sec.;
Pressure outside enclosure: atmospheric;
Pressure of sodium vapor within the enclosure: atmospheric+50 mb.;
Pressure inside the space 12: atmospheric+150 mb.;
Ambient temperature: 30 to 100° C.

It has been observed as a result of these tests that, in spite of temperature rises caused by friction, the temperature of the support always remained below 200° C., that corrosion by sodium vapor was zero and that leakages across the seal were of the order of 0.5 l./hr. per meter of seal.

Even in the case of frequent operations and prolonged utilization, a high standard of leak-tightness can be maintained while at the same time reducing the overall size of the whole assembly by combining the functions of load-carrying and sealing in a single unit.

As will be readily understood, a number of different modifications could be made in the form of construction which has been described in the foregoing without thereby departing from the purview of the invention.

What we claim is:

1. A leak-tight support for a rotary plug which serves to seal an enclosure, comprising a stationary track having a low coefficient of friction and laid on a flexible member which is secured to the wall of the enclosure and a crown-plate applied against said track in sliding contact therewith.

2. A support in accordance with claim 1, said track having in the central portion thereof a space communicating with a source of neutral gas at overpressure both with respect to the interior and with respect to the exterior of the enclosure.

3. A support in accordance with claim 1, said track having a low coefficient of friction, said flexible member being an annular member of an elastomer within an annular groove in the enclosure wall.

4. A support in accordance with claim 2, said track comprising two concentric spaced adjacent rings, the top faces of said rings being inclined towards the space between said rings.

5. A support in accordance with claim 4, said crown-plate having an underface of slightly frusto-conical shape corresponding to the shapes of said track rings.

6. A support in accordance with claim 3, said annular groove being in an annular boss of the enclosure wall and having a depth which is slightly greater than the thickness of said annular member and of said ring.

7. A support in accordance with claim 1, said crown-plate being steel.

8. A support in accordance with claim 1, said track being polytetrafluoroethylene.

References Cited

UNITED STATES PATENTS 3,173,846   3/1965   Chauvin et al. _____ 220—45
3,419,180   12/1968  Homrig et al.

GEORGE T. HALL, Primary Examiner